United States Patent
Liu et al.

(10) Patent No.: US 7,821,890 B2
(45) Date of Patent: Oct. 26, 2010

(54) APPARATUS FOR WRITING A DATA TO AN OPTICAL STORAGE MEDIA AND SERVO CONTROL UNIT AND LASER DIODE DRIVER UNIT THEREOF

(75) Inventors: Yuan-Chin Liu, Hsinchu (TW); Wen-Yi Wu, Jhubei (TW)

(73) Assignee: Mediatek Incorporation, Hsin-Chu (TW)

( * ) Notice: Subject to any disclaimer, the term of this patent is extended or adjusted under 35 U.S.C. 154(b) by 1405 days.

(21) Appl. No.: 11/255,655

(22) Filed: Oct. 21, 2005

(65) Prior Publication Data

US 2006/0140083 A1    Jun. 29, 2006

(30) Foreign Application Priority Data

Dec. 14, 2004    (TW) .............................. 93138824 A (51) Int. Cl.
    *G11B 7/00*    (2006.01)
(52) U.S. Cl. ................. 369/47.5; 369/53.26; 369/47.23
(58) Field of Classification Search ............... 369/47.23
    See application file for complete search history.

(56) References Cited

U.S. PATENT DOCUMENTS

| | | | |
|---|---|---|---|
| 6,414,932 B1 | 7/2002 | Kaku et al. ................. | 369/116 |
| 6,636,472 B2 | 10/2003 | Kurebayashi et al. ........ | 369/116 |
| 6,654,328 B2 | 11/2003 | Kaku et al. ............... | 369/53.26 |
| 2002/0126609 A1* | 9/2002 | Kaku et al. ............... | 369/53.26 |
| 2002/0186628 A1* | 12/2002 | Hoshino et al. ............ | 369/47.3 |
| 2003/0147316 A1* | 8/2003 | Asada et al. ............... | 369/47.3 |
| 2003/0206501 A1* | 11/2003 | Song et al. ................. | 369/30.1 |
| 2004/0150480 A1* | 8/2004 | Lee .............................. | 331/16 |
| 2006/0098543 A1* | 5/2006 | Hsu et al. ................. | 369/47.19 |

* cited by examiner

*Primary Examiner*—Lixi Chow
(74) *Attorney, Agent, or Firm*—Thomas, Kayden, Horstemeyer & Risley (57) ABSTRACT

An apparatus for writing data to an optical storage media and a servo control unit and a laser diode driver unit thereof. The apparatus making a laser diode emit light includes a servo control unit and a laser diode driver unit. The servo control unit includes a control unit for controlling a burning procedure and a modulation unit for outputting an encoded signal. The laser diode driver unit receives the encoded signal and includes a PLL unit, a write strategy generation unit and a lock/unlock detection unit. The PLL unit outputs at least one of a second clock signal and a second data signal according to the encoded signal. The write strategy generation unit outputs a control signal to control the laser diode according to the second clock signal and the second data signal. The lock/unlock detection unit outputs a lock indicator or an unlock indicator to the control unit.

24 Claims, 9 Drawing Sheets

APPARATUS FOR WRITING A DATA TO AN OPTICAL STORAGE MEDIA AND SERVO CONTROL UNIT AND LASER DIODE DRIVER UNIT THEREOF

This application claims the benefit of Taiwan application Serial No. 93138824, filed Dec. 14, 2004, the subject matter of which is incorporated herein by reference.

BACKGROUND OF THE INVENTION

1. Field of the Invention

The invention relates in general to an apparatus for writing data to an optical storage media, and more particularly to an apparatus for writing data to an optical storage media and a servo control unit and a laser diode driver unit thereof.

2. Description of the Related Art

Figure 1:
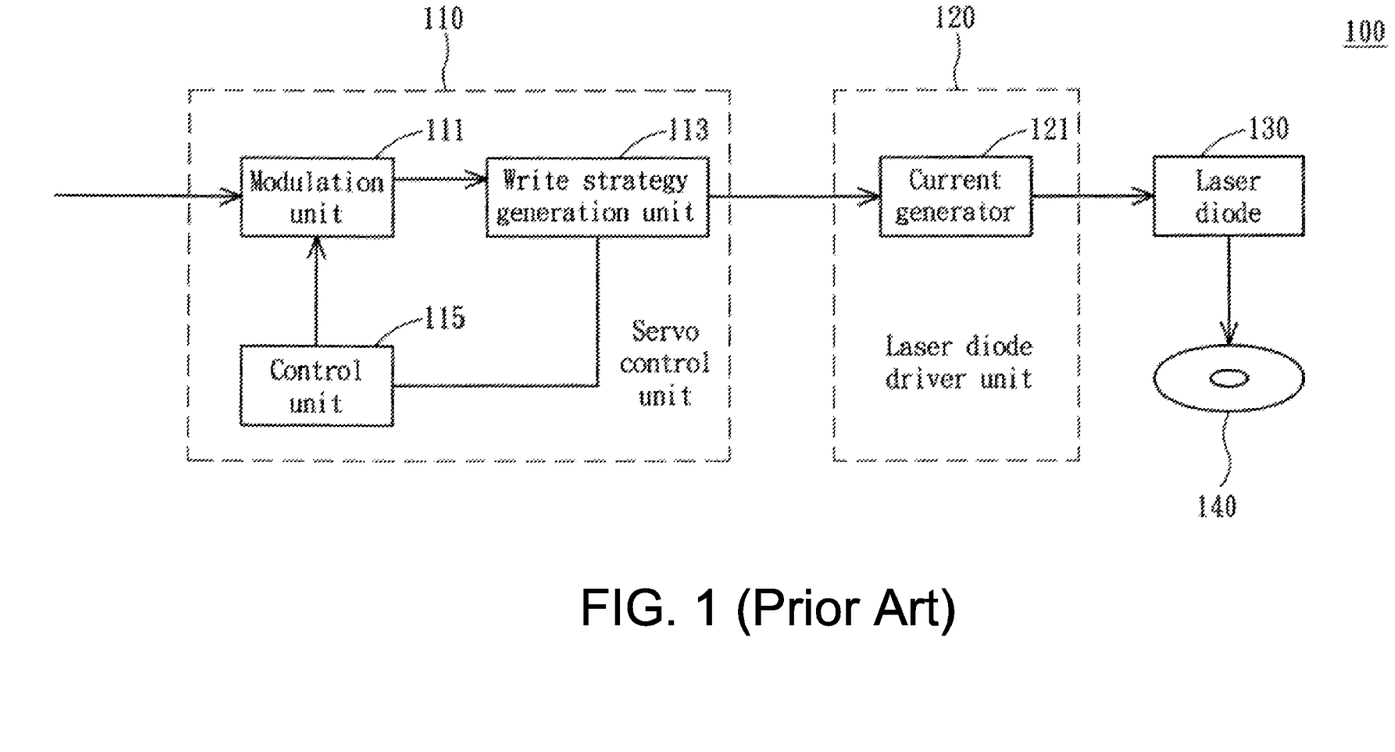
FIG. 1 shows the architecture of a conventional optical storage device.

FIG. 1 shows the architecture of a conventional optical storage device. Referring to FIG. 1, the conventional optical storage device 100 includes a servo control unit 110, a laser diode driver unit 120 and a laser diode 130. The servo control unit 110 includes a modulation unit 111, a write strategy generation unit 113 and a control unit 115. The modulation unit 111 receives the data to be written to the disk 140, and modulates and then outputs the data. Usually, the adopted modulation method is the EFM (Eight-to-Fourteen Modulation). The write strategy generation unit 113 receives the modulated data and converts the modulated data into a plurality of current control signals for the laser diode according to the write strategy. The current control signals are outputted to the laser diode driver unit 120 through a cable with multiple channels. The control unit 115 controls the operations of the modulation unit 111 and the write strategy generation unit 113. The laser diode driver unit 120 includes a current generator 121. The current generator 121 receives the current control signals and thus generates a control current to control the writing operation of the laser diode 130.

However, with the progressing of the optical storage technology and the increasing of the data capacity of the optical storage media, the write speed and the internal data transmission speed of the optical storage device have to be increased correspondingly. Because the servo control unit 110 and the laser diode driver unit 120 are disposed on different circuit boards, as mentioned above, the servo control unit 110 needs to transmit a current control signal to the laser diode driver unit 120 through the cable with multiple channels. When the writing operation is performed, the current control signal pertaining to a multi-pulse signal may have signal distortions. Thus, the signal distortions and the slow transmission speed may seriously influence the writing quality.

SUMMARY OF THE INVENTION

It is therefore an object of the invention to provide an apparatus for writing data to an optical storage media, and a servo control unit and a laser diode driver unit thereof. The control signal can be transmitted in a chip without distortion according to different optical storage device architectures, and only one signal wire between the servo control unit and the laser diode driver unit is needed to transmit the written data and the clock signal.

The invention achieves the above-identified object by providing an apparatus for writing data to an optical storage media and making a laser diode emit light. The apparatus includes a servo control unit and a laser diode driver unit. The servo control unit includes a control unit and a modulation unit. The control unit controls a burning procedure for writing the optical storage media. The modulation unit, which is controlled by the control unit, receives write data and modulates the write data into a first data signal. The modulation unit combines the first data signal with the sequence signal to form an encoded signal, and then outputs the encoded signal. The sequence signal corresponds to a first clock signal of the first data signal. The laser diode driver unit receives the encoded signal and includes a PLL (Phase-Locked Loop) unit, a write strategy generation unit and a lock/unlock detection unit. The PLL unit outputs at least one of a second clock signal and a second data signal according to the encoded signal. The write strategy generation unit outputs a control signal to control a writing operation of the laser diode according to the second clock signal and the second data signal. The lock/unlock detection unit detects a state of the PLL unit, and outputs a lock indicator or an unlock indicator to the control unit. The control unit starts or pauses the burning procedure according to the lock indicator or the unlock indicator.

The invention achieves the above-identified object by providing an apparatus for writing data to an optical storage media and making a laser diode emit light. The apparatus includes a servo control unit and a laser diode driver unit. The servo control unit includes a control unit, a modulation unit and a lock/unlock detection unit. The control unit controls a burning procedure for writing the optical storage media. The modulation unit, which is controlled by the control unit, receives write data and modulates the write data into a first data signal. The modulation unit further combines the first data signal with a sequence signal to form an encoded signal, and then outputs the encoded signal. The sequence signal corresponds to a first clock signal of the first data signal. The lock/unlock detection unit receives a divided clock signal and the first clock signal, and thus outputs a lock indicator or an unlock indicator to the control unit. The control unit starts or pauses the burning procedure according to the lock indicator or the unlock indicator. The laser diode driver unit for receiving the encoded signal includes a PLL (Phase-Locked Loop) unit, a write strategy generation unit and a divided clock generation unit. The PLL unit outputs at least one of a second clock signal and a second data signal according to the encoded signal. The write strategy generation unit outputs a control signal to control a writing operation of the laser diode according to the second clock signal and the second data signal. The divided clock generation unit outputs the divided clock signal according to the second clock signal.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 2:
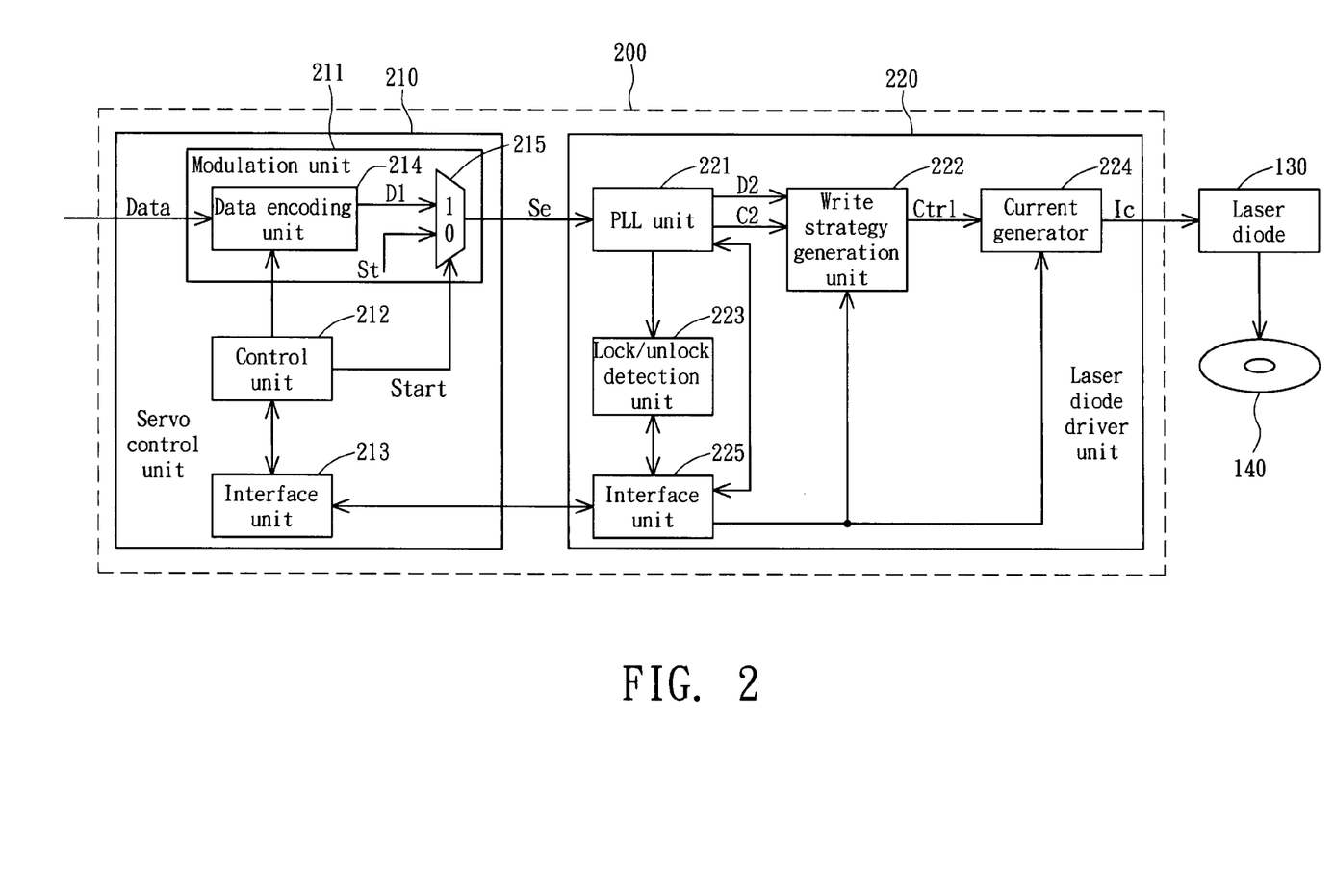
FIG. 2 is a block diagram showing an apparatus for writing data to an optical storage media according to a preferred embodiment of the invention.

FIG. 2 is a block diagram showing an apparatus for writing data to an optical storage media according to a preferred embodiment of the invention. Referring to FIG. 2, the apparatus 200 for writing data to the optical storage media makes a laser diode 130 emit light. The apparatus 200 includes a servo control unit 210 and a laser diode driver unit 220. The servo control unit 210 includes a control unit 212 and a modulation unit 211. The control unit 212 controls a burning procedure for writing the optical storage media 140. The modulation unit 211, which is controlled by the control unit 212, receives write data Data and modulates the write data Data into a data signal D1. The modulation unit 211 further combines the data signal D1 with a sequence signal St to form an encoded signal Se, and outputs the encoded signal Se. The sequence signal St corresponds to a clock signal C1 of the data signal D1. For example, the data signal D1 is the signal generated after the write data Data is EFM encoded and modulated.

The laser diode driver unit 220 receives the encoded signal Se and includes a PLL unit 221, a write strategy generation unit 222 and a lock/unlock detection unit 223. The PLL unit 221 outputs at least one of a clock signal C2 and a data signal D2 according to the encoded signal Se. The clock signal C2 corresponds to a clock signal of the data signal D2. The write strategy generation unit 222 outputs a control signal Ctrl to control a writing operation of the laser diode 130 according to the clock signal C2 and the data signal D2. The lock/unlock detection unit 223 detects a state of the PLL unit 221, and thus outputs a lock indicator or an unlock indicator to the control unit 212. The control unit 212 starts or pauses the burning procedure according to the lock indicator or the unlock indicator.

Figure 3:
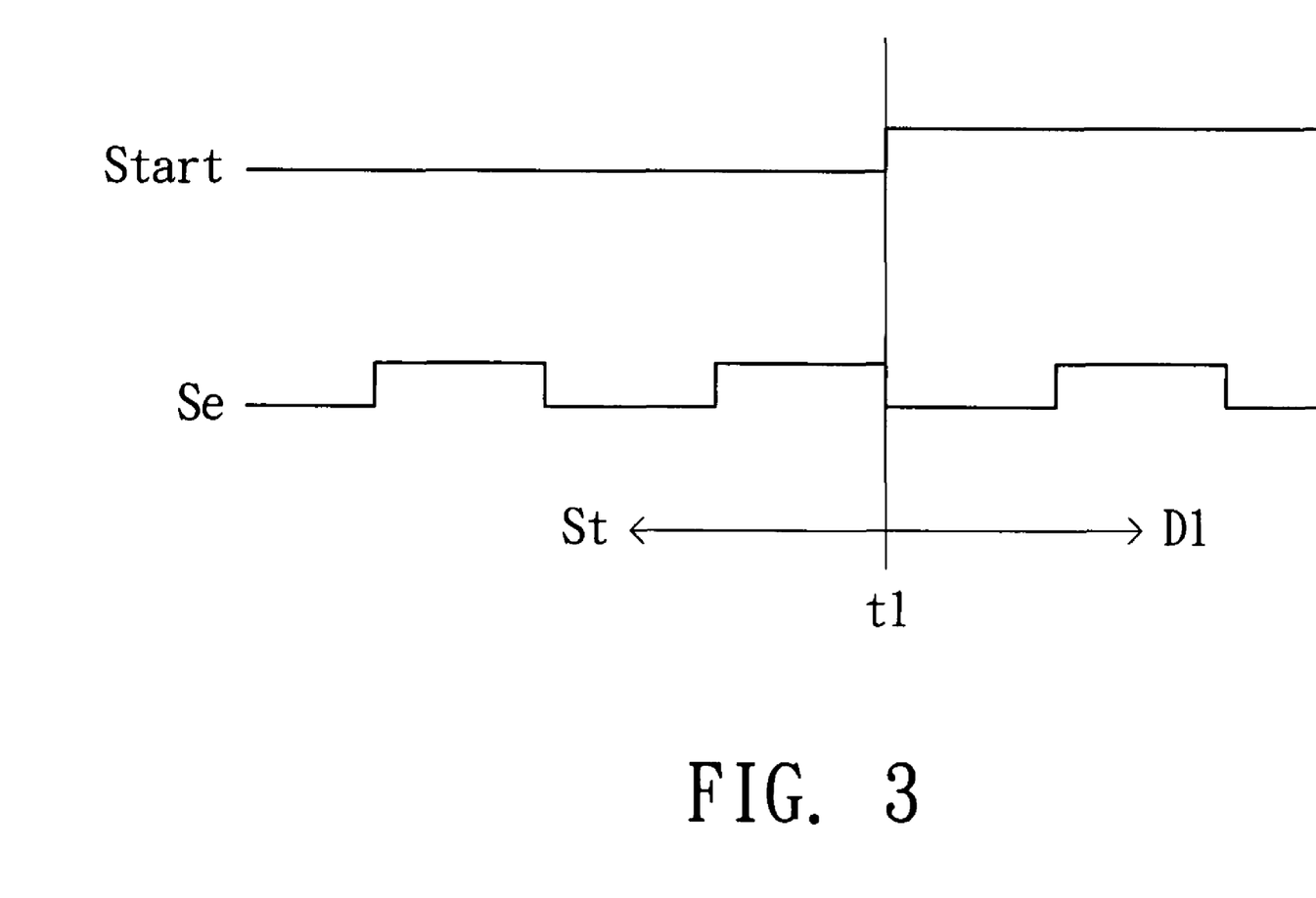
FIG. 3 is a timing chart showing the formation of the encoded signal.

The modulation unit 211 includes a data encoding unit 214 and a multiplexer 215. The data encoding unit 214 modulates the write data Data into the data signal D1. The multiplexer 215 receives the data signal D1 and the sequence signal St, and then determines to output the data signal D1 or the sequence signal St as the encoded signal Se according to the control of the control unit 212. FIG. 3 is a timing chart showing the formation of the encoded signal. As shown in FIG. 3, a start recording signal Start is used to start the burning procedure. The encoded signal Se is composed of a data signal D1 and the sequence signal St at different time intervals. Before time instant t1, the start recording signal Start is disabled (for example, at a low level), the burning procedure does not start or pauses, and the encoded signal Se is the sequence signal St. After time instant t1, the start recording signal Start is enabled (for example, at a high level). The burning procedure starts at time instant t1, and the encoded signal Se is the data signal D1.

Figure 4:
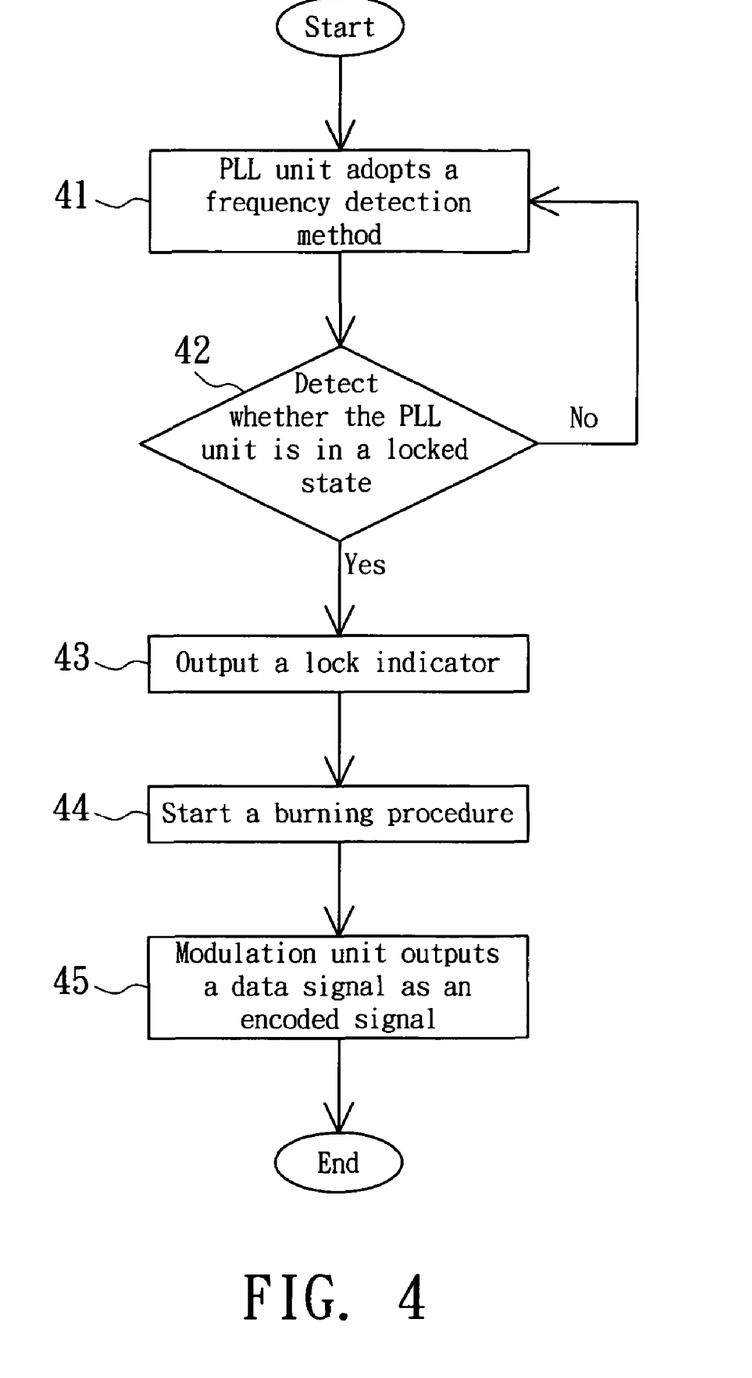
FIG. 4 is a flow chart showing steps for the apparatus 200 to start the burning procedure.

FIG. 4 is a flow chart showing steps for the apparatus 200 to start the burning procedure. First, when the burning procedure does not start or pauses, the encoded signal Se is the sequence signal St, and the PLL unit 221 adopts a frequency detection (FD) method to lock a frequency of the encoded signal Se and generate the clock signal C2, as shown in step 41. Next, the lock/unlock detection unit 223 detects whether or not the PLL unit 221 is in a locked state according to the clock signal C2 and the encoded signal Se, as shown in step 42. If the PLL unit 221 is not in the locked state, the procedure goes back to step 41. If the PLL unit 221 is in the locked state, the lock/unlock detection unit 223 outputs the lock indicator to the control unit 212, as shown in step 43. Thereafter, the control unit 212 receives the lock indicator, and then starts the burning procedure and outputs a start recording signal to the modulation unit 211, as shown in step 44. Finally, the modulation unit 211 receives the start recording signal Start, and then outputs the data signal D1 as the encoded signal Se, as shown in step 45.

Figure 5:
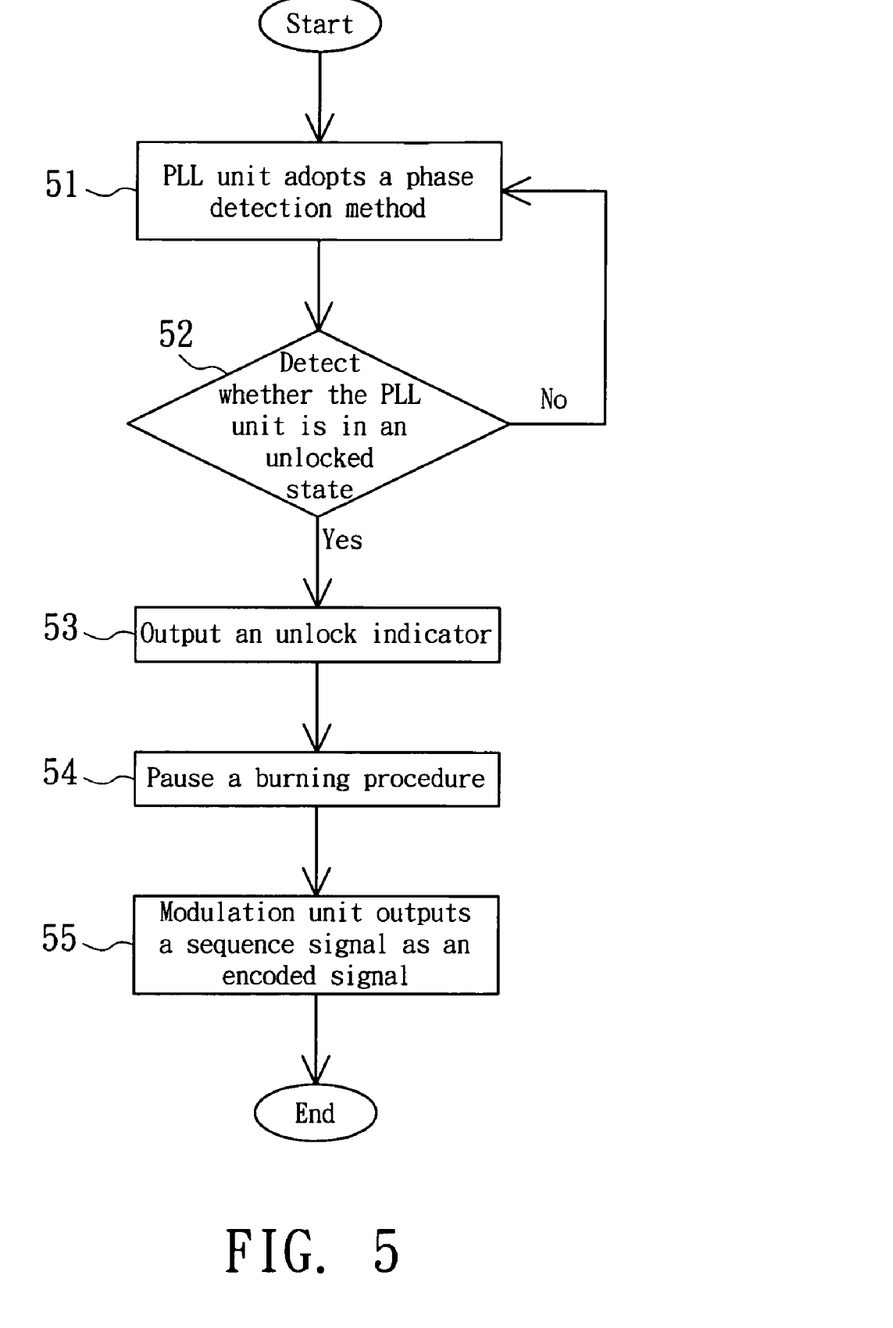
FIG. 5 is a flow chart showing steps for the apparatus 200 to pause the burning procedure.

FIG. 5 is a flow chart showing steps for the apparatus 200 to pause the burning procedure. First, when the burning procedure starts, the encoded signal Se is the data signal D1, and the PLL unit 221 adopts a phase detection (PD) method to lock a phase of the encoded signal Se and generate the data signal D2, as shown in step 51. Next, the lock/unlock detection unit 223 performs a phase unlocked detection according to the clock signal C2 and the data signal D2, as shown in step 52. If the PLL unit 221 is not the unlocked state, the procedure goes back to step 51. If the PLL unit 221 is in the unlocked state, the lock/unlock detection unit 223 outputs the unlock indicator to the control unit 212, as shown in step 53. Then, the control unit 212 receives the unlock indicator, and then pauses the burning procedure and outputs a pausing signal to the modulation unit 211, as shown in step 54. Finally, the modulation unit 211 receives the pausing signal, and then outputs the sequence signal St as the encoded signal Se, as shown in step 55.

The laser diode driver unit 220 further includes a current generator 224, which receives the control signal Ctrl and outputs a corresponding control current Ic to the laser diode 130 to make the laser diode 130 emit light and make the optical storage media 140 record the data signal D2. The control signal Ctrl includes, for example, a read pulse and a write pulse. The servo control unit 210 further includes an interface unit 213, and the laser diode driver unit 220 further includes an interface unit 225. The servo control unit 210 transfers a parameter setting value to the interface unit 225 of the laser diode driver unit 220 through the interface unit 213.

Figure 6:
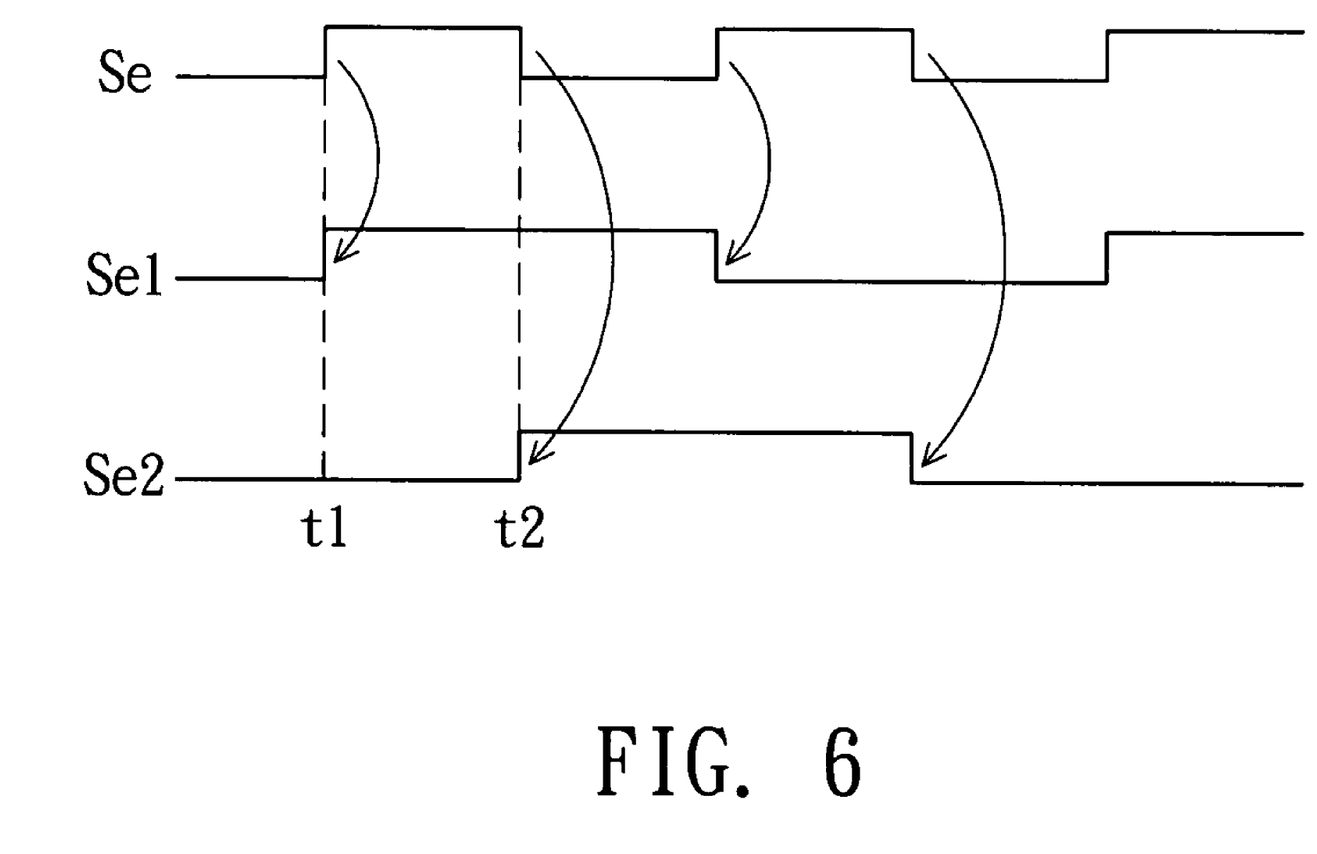
FIG. 6 is a schematic illustration showing that the encoded signal is converted into an even encoded signal and an odd encoded signal.

During the high speed writing operation, the high frequency encoded signal Se may be converted into an odd encoded signal Se1 and an even encoded signal Se2 with a lower frequency and then transmitted in order to reduce the signal distortion. FIG. 6 is a schematic illustration showing that the encoded signal is converted into an even encoded signal and an odd encoded signal. At time instant t1, the encoded signal Se has a rising edge, and the level of the odd encoded signal Se1 is correspondingly changed. At time instant t2, the encoded signal Se has a falling edge, and the level of the even encoded signal Se2 is correspondingly changed. That is, the level of the odd encoded signal Se1 is changed when the level of the encoded signal Se is changed by an odd number of times; and the level of the even encoded signal Se2 is correspondingly changed when the level of the encoded signal Se is changed by an even number of times. The modulation unit 211 may convert the encoded signal Se into the odd encoded signal Se1 and the even encoded signal Se2, and outputs the odd encoded signal Se1 and the even encoded signal Se2 to the PLL unit 221.

Figure 7:
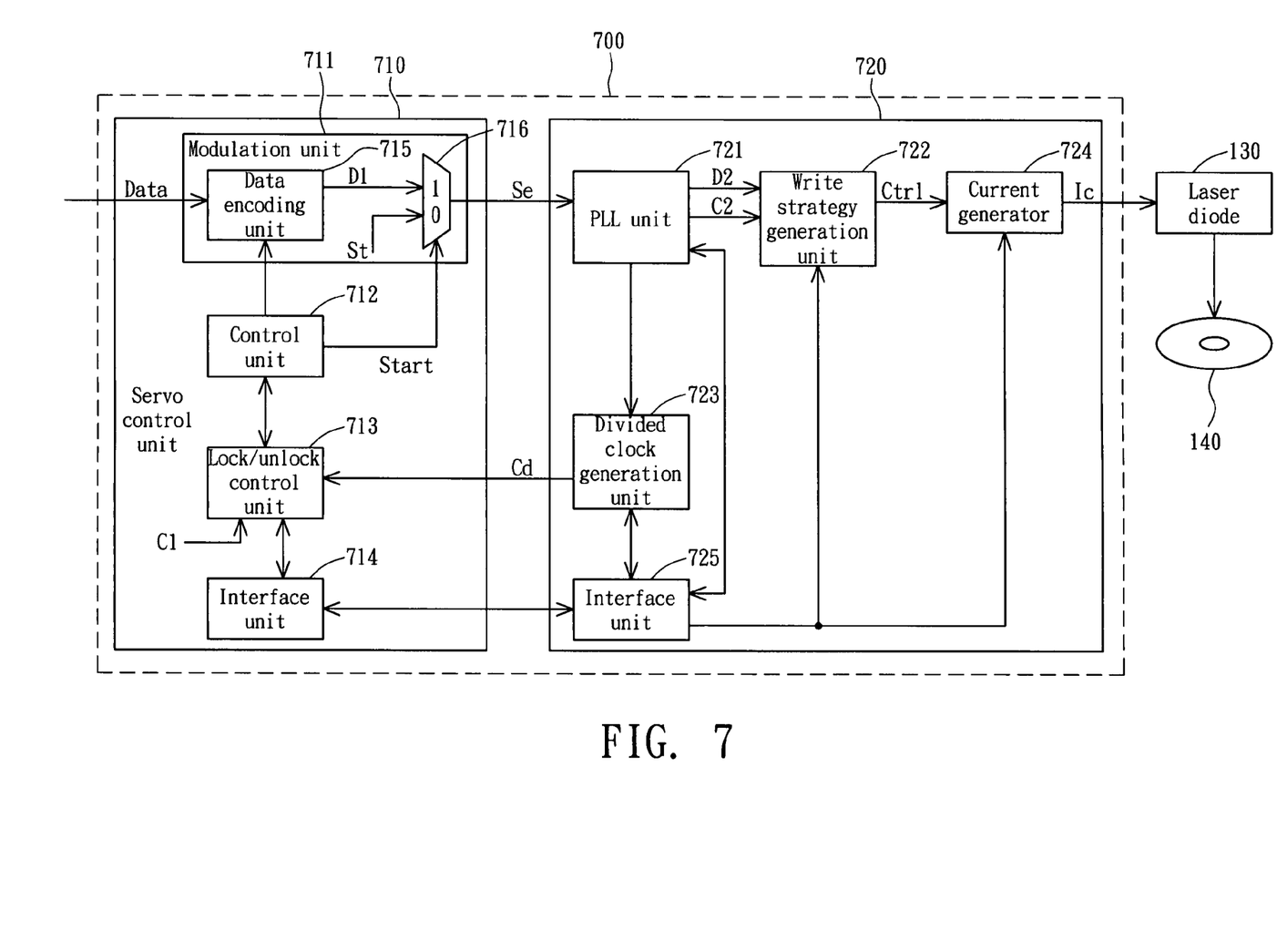
FIG. 7 is a block diagram showing an apparatus for writing data to an optical storage media according to another preferred embodiment of the invention.

FIG. 7 is a block diagram showing an apparatus for writing data to an optical storage media according to another preferred embodiment of the invention. The apparatus 700 for writing data to the optical storage media makes a laser diode 130 emit light and includes a servo control unit 710 and a laser diode driver unit 720. The servo control unit 710 includes a control unit 712, a modulation unit 711 and a lock/unlock detection unit 713. The control unit 712 controls a burning procedure for writing the optical storage media 140. The modulation unit 711, which is controlled by the control unit 712, receives write data Data and modulates the write data Data into a data signal D1 by way of the encoding method such as the EFM. The modulation unit 711 combines the data signal D1 with a sequence signal St to form an encoded signal Se, and then outputs the encoded signal Se. The sequence signal St corresponds to a clock signal C1 of the data signal D1. The lock/unlock detection unit 713 receives a divided clock signal Cd and the clock signal C1, and thus outputs a lock indicator or an unlock indicator to the control unit 712. The control unit 712 starts or pauses the burning procedure according to the lock indicator or the unlock indicator.

The laser diode driver unit 720 for receiving the encoded signal Se includes a PLL unit 721, a write strategy generation unit 722 and a divided clock generation unit 723. The PLL unit 721 outputs at least one of a clock signal C2 and a data signal D2 according to the encoded signal Se. The write strategy generation unit 722 outputs a control signal Ctrl to control a writing operation of the laser diode 130 according to the clock signal C2 and the data signal D2. The divided clock generation unit 723 outputs the divided clock signal Cd according to the clock signal C2.

The modulation unit 711 includes a data encoding unit 715 and a multiplexer 716. The data encoding unit 715 modulates the write data Data into the data signal D1. The multiplexer 716 receives the data signal D1 and the sequence signal St, and determines to output the data signal D1 or the sequence signal St as the encoded signal Se according to the control of the control unit 712. Similar to the encoded signal of the previous embodiment, the encoded signal Se of this embodiment is composed of the data signal D1 and the sequence signal St at different time intervals, and detailed descriptions thereof will be omitted.

Figure 8:
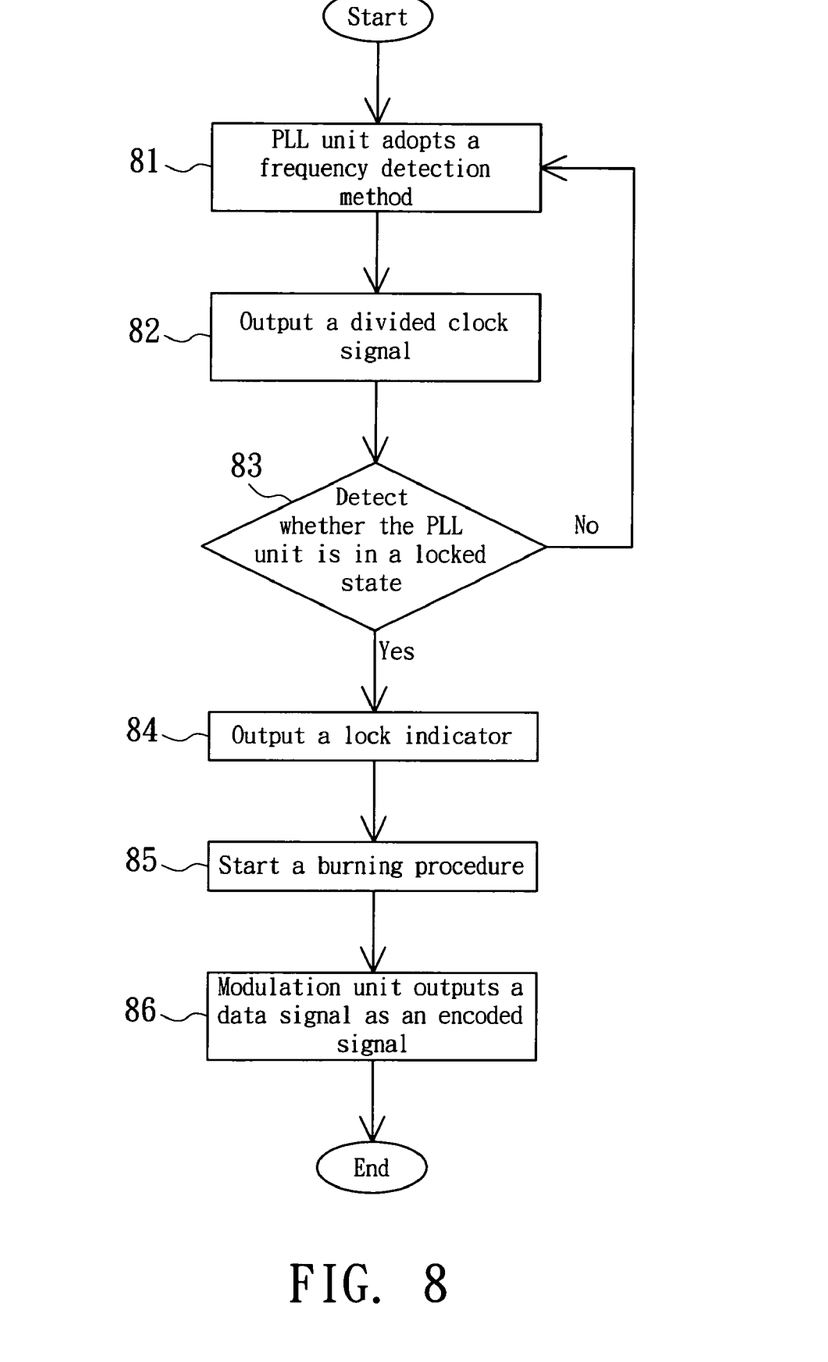
FIG. 8 is a flow chart showing steps for the apparatus 700 to start the burning procedure.

FIG. 8 is a flow chart showing steps for the apparatus 700 to start the burning procedure. First, when the burning procedure does not start or pauses, the encoded signal Se is the sequence signal St, and the PLL unit 721 adopts the frequency detection method to lock the frequency of the encoded signal Se and generate the clock signal C2, as shown in step 81. Next, the divided clock generation unit 723 outputs the divided clock signal Cd according to the clock signal C2, as shown in step 82. Thereafter, the lock/unlock detection unit 713 detects whether or not the PLL unit 721 is in the locked state according to the divided clock signal Cd and the clock signal C1, as shown in step 83. If the PLL unit 721 is in the locked state, the procedure goes back to step 81. When the PLL unit 721 is in the locked state, the lock/unlock detection unit 713 outputs the lock indicator to the control unit 712, as shown in step 84. Thereafter, the control unit 712 receives the lock indicator, and then starts the burning procedure and outputs a start recording signal Start to the modulation unit 711, as shown in step 85. Finally, the modulation unit 711 receives the start recording signal Start, and then outputs the data signal D1 as the encoded signal Se, as shown in step 86.

Figure 9:
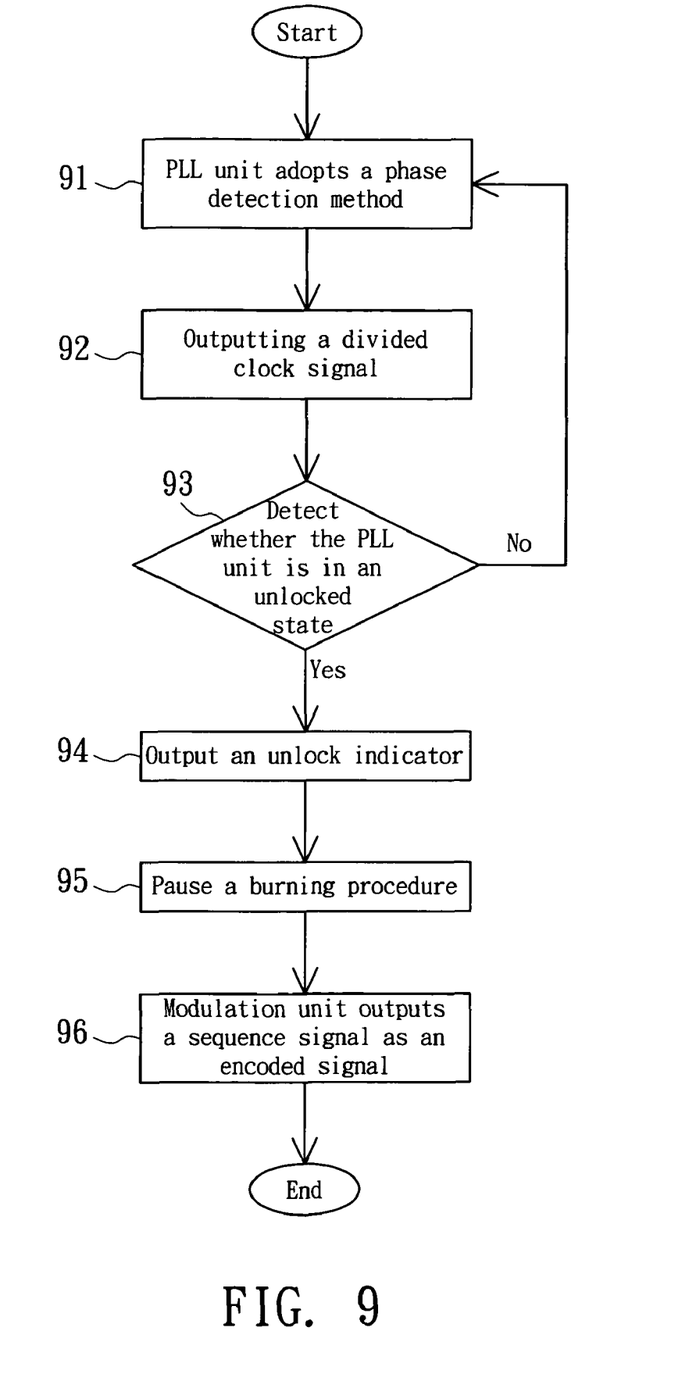
FIG. 9 is a flow chart showing steps for the apparatus 700 to pause the burning procedure.

FIG. 9 is a flow chart showing steps for the apparatus 700 to pause the burning procedure. First, when the burning procedure starts, the encoded signal Se is the data signal D1, and the PLL unit 721 adopts the phase detection method to lock the phase of the encoded signal Se and generate the data signal D2, as shown in step 91. Next, a divided clock signal unit 723 outputs the divided clock signal Cd according to the clock signal C2, as shown in step 92. Thereafter, the lock/unlock detection unit 713 performs the phase unlocked detection according to the divided clock signal Cd and the clock signal C1, as shown in step 93. If the PLL unit 721 is not in the unlocked state, the procedure goes to step 91. If the PLL unit 721 is in the unlocked state, the lock/unlock detection unit 713 outputs the unlock indicator to the control unit 712, as shown in step 94. The control unit 712 receives the unlock indicator, and then pauses the burning procedure and outputs a pausing signal to the modulation unit 711, as shown in step 95. Finally, the modulation unit 711 receives the pausing signal, and then outputs the sequence signal St as the encoded signal Se, as shown in step 96.

The laser diode driver unit 720 further includes a current generator 724, which receives the control signal Ctrl and outputs a corresponding control current Ic to the laser diode 130 to make the laser diode 130 emit light and make the optical storage media 140 record the data signal D2. The control signal Ctrl includes, for example, a read pulse and a write pulse. The servo control unit 710 further includes an interface unit 714, and the laser diode driver unit 720 further includes an interface unit 725. The servo control unit 710 transfers a parameter setting value to an interface unit 725 of the laser diode driver unit 720 through the interface unit 714. The modulation unit 711 may convert the encoded signal Se into an odd encoded signal Se1 and an even encoded signal Se2, and output the odd encoded signal Se1 and the even encoded signal Se2 to the PLL unit 721. The procedures are also shown in FIG. 6.

In the apparatus for writing data to the optical storage media and the servo control unit and the laser diodes thereof according to the embodiments of the invention, the write strategy generation unit is disposed in the laser diode driver unit, such that the write strategy generation unit and the current generator are disposed in the same chip. Consequently, the control signal generated by the write strategy generation unit may be transferred to the current generator through the signal transmission in the chip, so as to control the writing operation of the laser diode. In general, the frequency of the encoded signal Se is lower than that of the control signal generated by the write strategy generation unit. So, the signal distortion tends to disappear when the signal is transmitted on the signal wire. Because the control signal generated by the write strategy generation unit does not have to be transmitted through a cable in this invention, the good write quality may be kept at the high writing speed. In addition, the invention only needs one signal wire to transmit the encoded signal Se, which is composed of the data signal D1 and the sequence signal St, to the PLL unit 221, such that the PLL unit 221 generates the clock signal C2 and the data signal D2 needed by the laser diode driver unit. Thus, the invention has the advantage of reducing the number of signal wires and the cost. The invention may further convert the encoded signal into the odd and even encoded signals in order to reduce the signal distortion, the signal deformation and the too-slow transmission when a cable with a lower transmission speed is used.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for writing data to an optical storage media and making a laser diode emit light, the apparatus comprising:
    a servo control unit, which comprises:
        a control unit for controlling a burning procedure for writing the optical storage media; and
        a modulation unit, which is controlled by the control unit, for receiving write data and modulating the write data into a first data signal, combining the first data signal with a sequence signal, which corresponds to a first clock signal of the first data signal, to form an encoded signal, and then outputting the encoded signal; and
    a laser diode driver unit for receiving the encoded signal, the laser diode driver unit comprising:
        a PLL (Phase-Locked Loop) unit for outputting at least one of a second clock signal and a second data signal according to the encoded signal;
        a write strategy generation unit for outputting a control signal to control a writing operation of the laser diode according to the second clock signal and the second data signal; and
        a lock/unlock detection unit for detecting a state of the PLL unit and outputting a lock indicator or an unlock indicator to the control unit accordingly, the control unit starting or pausing the burning procedure according to the lock indicator or the unlock indicator, wherein:
    the encoded signal is composed of the first data signal and the sequence signal at different time intervals;
    the encoded signal is the sequence signal when the burning procedure does not start or pauses; and
    the encoded signal is the first data signal when the burning procedure starts.

2. The apparatus according to claim 1, wherein the laser diode driver unit further comprises a current generator for receiving the control signal and outputting a corresponding control current to the laser diode to make the laser diode emit light and the optical storage media record the second data signal.

3. The apparatus according to claim 1, wherein the servo control unit further comprises a first interface unit, the laser diode driver unit further comprises a second interface unit, and the servo control unit transfers a parameter setting value to the second interface unit of the laser diode driver unit through the first interface unit.

4. The apparatus according to claim 1, wherein the modulation unit modulates the write data into the first data signal according to an EFM (Eight-to-Fourteen Modulation).

5. The apparatus according to claim 1, wherein the modulation unit converts the encoded signal into an odd encoded signal and an even encoded signal, and outputs the odd encoded signal and the even encoded signal to the PLL unit.

6. The apparatus according to claim 1, wherein when the burning procedure does not start or pauses,
    the PLL unit adopts a frequency detection (FD) method to lock a frequency of the encoded signal and generate the second clock signal;
    the lock/unlock detection unit detects whether or not the PLL unit is at a locked state according to the second clock signal and the encoded signal;
    the lock/unlock detection unit outputs the lock indicator to the control unit when the PLL unit is in the locked state;
    the control unit receives the lock indicator and then starts the burning procedure and outputs a start recording signal to the modulation unit; and
    the modulation unit receives the start recording signal and then outputs the first data signal as the encoded signal.

7. The apparatus according to claim 1, wherein when the burning procedure starts,
    the PLL unit adopts a phase detection (PD) method to lock a phase of the encoded signal and generate the second data signal;
    the lock/unlock detection unit performs a phase unlocked detection according to the second clock signal and the second data signal;
    the lock/unlock detection unit outputs an unlock indicator to the control unit when the PLL unit is in an unlocked state;
    the control unit receives the unlock indicator, and then pauses the burning procedure and outputs a pausing signal to the modulation unit; and
    the modulation unit receives the pausing signal and then outputs the sequence signal as the encoded signal.

8. A servo control unit for outputting an encoded signal to a laser diode driver unit, the servo control unit comprising:
    a control unit for controlling a burning procedure for writing the optical storage media; and
    a modulation unit, which is controlled by the control unit, for receiving write data and modulating the write data into a data signal, combining the data signal with a sequence signal, which corresponds a clock signal of the data signal, to form an encoded signal, and then outputting the encoded signal;
    wherein the encoded signal is composed of the data signal and the sequence signal at different time intervals, the encoded signal is the sequence signal when the burning procedure does not start or pauses, and the encoded signal is the data signal when the burning procedure starts.

9. The unit according to claim 8, wherein the servo control unit further comprises an interface unit, through which the servo control unit transfers a parameter setting value to the laser diode driver unit.

10. The unit according to claim 8, wherein the modulation unit modulates the write data into the data signal according to an EFM (Eight-to-Fourteen Modulation).

11. The unit according to claim 8, wherein the modulation unit converts the encoded signal into an odd encoded signal and an even encoded signal, and outputs the odd encoded signal and the even encoded signal to the laser diode driver unit.

12. The unit according to claim 8, wherein when the laser diode driver unit outputs a lock indicator to the control unit,
    the control unit receives the lock indicator, and then starts the burning procedure and outputs a start recording signal to the modulation unit; and
    the modulation unit receives the start recording signal, and then outputs the data signal as the encoded signal.

13. The unit according to claim 8, wherein when the laser diode driver unit outputs an unlock indicator to the control unit,
    the control unit receives the unlock indicator, and then pauses the burning procedure and outputs a pausing signal to the modulation unit; and
    the modulation unit receives the pausing signal, and then outputs the sequence signal as the encoded signal.

14. A laser diode driver unit for receiving an encoded signal outputted by a servo control unit, the laser diode driver unit comprising:
    a PLL (Phase-Locked Loop) unit for acquiring at least one of a clock signal and a first data signal according to the encoded signal;

a write strategy generation unit for outputting a control signal to control a writing operation according to the clock signal and the first data signal; and a lock/unlock detection unit for detecting the PLL unit, and outputting a lock indicator or an unlock indicator to the servo control unit accordingly to start or pause a burning procedure;

wherein the encoded signal is composed of a second data signal and a sequence signal at different time intervals;

the encoded signal is derived from the sequence signal when the burning procedure pauses; and the encoded signal is derived from the second data signal when the burning procedure starts.

15. The unit according to claim 14, further comprising a current generator for receiving the control signal and correspondingly outputting a control current to a laser diode to generate laser diode emit light for writing data.

16. The unit according to claim 14, further comprising an interface unit, through which the laser diode driver unit receives a parameter setting value outputted by the servo control unit.

17. The unit according to claim 14, wherein when the burning procedure does not start or pauses, the PLL unit locks a frequency of the encoded signal and generate the clock signal;

the lock/unlock detection unit detects whether or not the PLL unit is locked according to the clock signal and the encoded signal;

the lock/unlock detection unit outputs the lock indicator to the servo control unit when the PLL unit is locked; and the servo control unit receives a start recording signal and then starts the burning procedure.

18. The unit according to claim 14, wherein when the burning procedure starts, the PLL unit locks a phase of the encoded signal and generate the first data signal;

the lock/unlock detection unit performs a phase unlocked detection according to the clock signal and the first data signal;

the lock/unlock detection unit outputs an unlock indicator to the servo control unit when the PLL unit is unlocked; and the servo control unit receives the unlock indicator and then pauses the burning procedure.

19. A method of writing data to an optical storage media and making a laser diode emit light, the method comprising the steps of:

modulating write data into a first data signal;

combining the first data signal with a sequence signal, which corresponds to a first clock signal of the first data signal, to form an encoded signal; generating at least one of a second clock signal and a second data signal according to the encoded signal;

generating a control signal to control a writing operation of the laser diode according to the second clock signal and the second data signal;

detecting states of the encoded signal and the second clock signal, and outputting a lock indicator or an unlock indicator accordingly; and starting or pausing a burning procedure for writing the optical storage media according to the lock indicator or the unlock indicator, wherein the encoded signal is composed of the first data signal and the sequence signal at different time intervals, the encoded signal is the sequence signal when the burning procedure does not start or pauses, and the encoded signal is the first data signal when the burning procedure starts.

20. The method according to claim 19, wherein the step of controlling the writing operation of the laser diode comprises:

outputting a corresponding control current to the laser diode according to the control signal; and making the laser diode emit light and making the optical storage media record the second data signal according to the control current.

21. The method according to claim 19, wherein in the step of modulating the write data into the first data signal, the write data is modulated into the first data signal according to an EFM (Eight-to-Fourteen Modulation).

22. The method according to claim 19, wherein in the step of modulating the write data into the first data signal, the encoded signal is converted into an odd encoded signal and an even encoded signal for output.

23. The method according to claim 19, further comprising, when the burning procedure does not start or pauses, the steps of:

adopting a frequency detection method to lock a frequency of the encoded signal and generate the second clock signal;

detecting whether or not the encoded signal and the second clock signal are in a locked state according to the second clock signal and the encoded signal;

outputting the lock indicator when the encoded signal and the second clock signal are in the locked state;

starting the burning procedure and outputting a start recording signal according to the lock indicator; and outputting the first data signal as the encoded signal according to the start recording signal.

24. The method according to claim 19, further comprising, when the burning procedure starts, the steps of:

adopting a phase detection method to lock a phase of the encoded signal and generate the second data signal;

performing a phase unlocked detection according to the second clock signal and the second data signal;

outputting an unlock indicator when the second clock signal and the second data signal are in an unlocked state;

pausing the burning procedure and outputting a pausing signal according to the unlock indicator; and outputting the sequence signal as the encoded signal according to the pausing signal.

* * * * *